Feb. 22, 1949.   D. W. WOODWARD   2,462,151
PHOTOGRAPHIC ELEMENTS HAVING HYDROPHILIC
POLYVINYL ACETAL COLLOID SUB-LAYERS
Filed Sept. 23, 1946
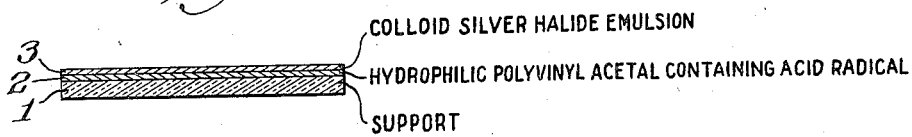
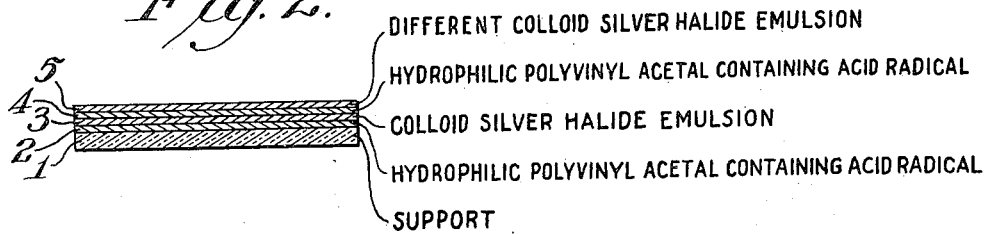
INVENTOR.
David W. Woodward
BY
ATTORNEY Patented Feb. 22, 1949

2,462,151

UNITED STATES PATENT OFFICE 2,462,151

PHOTOGRAPHIC ELEMENTS HAVING HYDROPHILIC POLYVINYL ACETAL COLLOID SUBLAYERS

David W. Woodward, Wilmington, Del., assignor to E. I. du Pont de Nemours & Company, Wilmington, Del., a corporation of Delaware Application September 23, 1946, Serial No. 698,799

9 Claims. (Cl. 95—9)

1

This invention relates to photographic elements having an improved anchoring layer. More particularly, it relates to photographic elements which comprise a water-insensitive support, an anchoring layer composed of a hydrophilic acetal of a vinyl alcohol polymer with an aldehyde containing a carboxylic acid or sulfonic acid group and water-permeable colloid layers. It also relates to processes of preparing such elements.

An object of this invention it to provide new and improved photographic elements. A further object is to provide photographic elements with improved substratum or anchor coatings. Another object is to provide a simple and effective means for anchoring water-permeable colloid layers to water-insensitive supports. A still further object is to provide a means for anchoring hydrophilic synthetic hydroxyl polymer layers to water-insensitive supports and to other water-permeable colloid layers. Still other objects will be apparent from the following description of the invention.

In the preparation of photographic elements, it is generally desirable to permanently affix a water-permeable colloid layer to a water-insensitive support. It is also desirable to permanently unite such a layer with a layer composed of a different water-permeable colloid which is incompatible with the first colloid. The layers of such elements should be resistant to stripping when dry or when soaked in water. Materials suitable for this use must (1) be soluble or dispersible in a solvent which will dissolve or soften the surface to be coated, (2) form a coating free from tackiness so that the film containing the anchor coating can be rolled and stored prior to coating, (3) be water-permeable, and (4) be free from color and form a clear transparent layer. The problem obviously is not one of simple adhesion since many compounds known as adhesives are not satisfactory for producing anchorage of this type.

This application is a continuation-in-part of copending application Serial Number 551,801, filed August 30, 1944, now abandoned.

It has now been found that the colorless, hydrophilic macromolecular acetals of a vinyl alcohol polymer with an aldehyde containing carboxylic acid and/or sulfonic acid groups and which are also free from color-generating groups are well suited as anchoring materials in the relation just described. The acetals may be used in the form of free acids or in the form of the

2 salts. These acetals are not only valuable for anchoring water-permeable colloids to water-insensitive supports but also for anchoring or uniting two dissimilar water-permeable colloids which are incompatible. Thus, layers of hydrophilic hydroxyl polymers, e. g., polyvinyl acetals, vinyl alcohol polymers, etc., which do not adhere well to gelatin, can be anchored satisfactorily to a gelatin stratum with the aforesaid polymeric acetals.

In the accompanying drawing Fig. 1 is an enlarged cross-sectional view of one type of element of this invention. In this figure, 1 represents a support, such as a vinyl polymer, a cellulose derivative, a super-polymer, or a water-proofed paper; 2 represents a substratum composed of the acidic or neutralized acetals of vinyl alcohol polymers with aldehydes containing a carboxylic or sulfonic acid group; 3 represents a water-permeable colloid layer, e. g., gelatin, containing a radiation-sensitive material. A modified type of element is shown in Fig. 2. In this figure, layers 1, 2, and 3 have the above significance; 4 represents a layer similar to 2; and 5 is a second layer composed of a different water-permeable colloid, e. g., a hydrophilic polyvinyl alcohol or acetal which may contain a silver halide.

The aforedescribed hydrophilic acetals of vinyl alcohol polymers can be applied to the support from a solution or dispersion in a solvent in the same general manner that gelatin-acetic acid-alcohol subbing solutions are applied. It is usually advantageous to use a solvent which is volatile and softens or dissolves the surface of the support of the photographic element when it is desired to anchor a water-permeable layer thereto. Thus, for cellulose acetate film base an acetone-ethanol solution or dispersion of the acetal may be used. For a cellulose nitrate film base a solvent mixture predominating in methanol or acetone may be used. However, with these hydrophilic acetals it has been found that in many cases a solvent of substantially lower softening action can be used. Thus, alcohol/water solutions containing as much as 40% of water may often be employed advantageously. With other types of supports, still other solvents may be resorted to.

These hydrophilic acetals are preferably contained in the subbing solutions in concentrations of the order of 0.025 to 0.2%. Such solutions when coated on the support give anchoring layers which increase the thickness of the support by less than 10 microns. Thicker layers are undesirable as the anchorage is impaired if the layer is greater in thickness than about 10 microns.

The coating solutions are preferably substantially neutral and the pH can be adjusted by neutralizing the free acid groups with bases capable of yielding water-soluble salts, e. g., alkali metals, ammonia, amines, etc. In the preparation of the more conventional gelatin subbing solutions it has been the practice to use low molecular weight acids or bases to control the pH. In subsequent coating operations they often are leached out into the light-sensitive emulsion layer with resulting harmful effects. With the present macromolecular polyvinyl acetal coating solutions, the pH can be controlled accurately without introducing low molecular weight leachable materials since any acidic groups are an integral part of the acetals used in accordance with the teachings of this invention. The acidic macromolecular acetals when in aqueous solutions or dispersions have a low pH. They can be neutralized or made slightly basic (pH 7–9) by salt formation with alkali metals, ammonia, or amines which form water-soluble salts, e. g., mono-, di-, and tri-methylamine, mono-, di-, and tri-ethylamine, piperidine, cyclohexylamine, ethylenediamine-1,2, hexamethylenediamine-1,6, piperazine, morpholine, etc. Neutral or slightly basic (pH 8–9) solutions or dispersions are advantageous because of their freedom from effect on the emulsions and their ability to neutralize any acidic materials that may be released by the support through decomposition. Moreover, they are more stable than the acidic solutions or dispersions.

The acetals used in the substratum coatings can be made by the reaction of a vinyl alcohol polymer, including interpolymers, with an aldehyde containing a sulfonic acid or a carboxylic acid group under acetal-forming conditions until a hydrophilic acetal is formed. For example, the acetalization may be conveniently carried out in solution or suspension in water or an organic solvent or diluent using a catalyst such as phosphoric acid, sulfuric acid, hydrochloric acid, etc. Suitable procedures and aldehydes are described in United States Patent 2,310,943 and in German Patent No. 643,650. The free acid groups can be converted into salt groups by a simple neutralization as described above and in the United States patent.

Partially and completely hydrolyzed polyvinyl alcohols of low, intermediate, and high viscosity having a molecular weight of 5,000 to 50,0000 and hydrolyzed interpolymers of vinyl esters with one or less equivalent of a terminally unsaturated interpolymerizable organic compound can be used in preparing the hydrophilic vinyl-alcohol acetals of aldehydes containing carboxylic or sulfonic acid groups. In general, such polymers having for each 100 carbon atoms between 20 and 50 free non-phenolic hydroxyl groups are useful.

Hydrophilic macromolecular acetals of vinyl alcohol polymers useful in accordance with this invention are prepared by acetalization from (1) polyvinyl alcohol of high molecular weight (viscosity of 4% aqueous solution at 20° C., 40 to 60 centipoises), (2) polyvinyl alcohol of medium molecular weight (viscosity of 4% aqueous solution at 20° C., 15 to 30 centipoises) which may be substituted with ester groups, e. g., acetate, propionate groups, acetal groups, e. g., formal, acetal, propional, butyral, and benzal groups, and (3) 75–100% hydrolyzed interpolymers of vinyl acetate with 0.05 to 0.5 mol equivalents of terminally unsaturated mono-olefins, e. g., ethylene, such as described in United States Patent 2,386,347, and (4) completely hydrolyzed interpolymers of vinyl acetate with minor proportions (less than 50%) of polymerizable vinyl or vinylidene compounds, for example, vinyl chloride, vinyl cyanide, alkyl methacrylates, e. g., methyl and ethyl methacrylate, etc., with an aldehyde containing free carboxylic or sulfonic acid groups or water-soluble salts of such groups.

The degree of substitution of the acetal groups may vary over a considerable range. Thus, vinyl alcohol polymers having between 1 and 20% of the hydroxyl groups acetalized with the aforedescribed aldehydes have been found useful. However, it has been found that the best results are obtained when between 2 and 12% of the hydroxyl groups are acetalized with the aldehydes. The total acidic acetal content based on these figures will vary depending on the hydroxyl content of the polymer and the acidic aldehyde used, but it has been found that the best results are obtained when between 3 and 20% by weight of the polymer is contributed by the aldehyde groups. The acetals having this degree of substitution may be used in the form of the free acids but are preferably used in the form of the water-soluble salts which are soluble to the extent of at least 5% at temperatures below 30° C. in methanol or ethanol containing up to 50% of water. A higher degree of substitution is undesirable for the purposes of the present invention since such polymers, while yielding good dry adhesion, are inferior in wet anchorage permitting the layers to separate when soaked in aqueous solutions.

While any aldehyde containing a free carboxylic or sulfonic acid radical may be used in preparing these acetals, those having a molecular weight of less than 200 are preferred as, in general, they react more readily and completely. These aldehyde-acids may be aromatic, aliphatic, or mixed aromatic-aliphatic.

The term "hydrophilic" as used in this application and claims when referring to the aforedescribed acetals is intended to denote compounds which in the form of thin layers, e. g., one to ten microns, are insoluble in water at 20° C. but are freely water-permeable.

After the substratum coating, composed of the aforedescribed polyvinyl acetals, has been applied and dried, it may then be coated with a layer of a water-permeable colloid. For instance, a flowable gelatino-silver halide emulsion may be coated in the conventional manner and dried. Additional coatings can be applied in like manner. The resulting elements exhibit good anchorage between the support, etc. and the water-permeable colloid layers by reason of the novel polyvinyl acetal layers.

The invention will be further illustrated by the following examples. The parts are by weight.

*Example I*

A 10% solution in methanol of an ethylene/vinyl acetate interpolymer of mol ratio about 1 of ethylene to 20 of vinyl acetate prepared according to Hanford and Roland United States application Serial Number 446,116 filed June 6, 1942, now abandoned, and (Examples 5 and 7) is mixed with an equal volume of 10% sodium hydroxide in methanol and boiled for one hour. The aforesaid interpolymer is also described in British Patent application 9091/43, filed June 7, 1943. The precipitated completely hydrolyzed polymer is filtered, washed with methanol, and dried. A mixture of 44 parts of this completely hydrolyzed ethylene/vinyl alcohol interpolymer, 32 parts of benzaldehyde-o-sulfonic acid, 400 parts of glacial acetic acid, and 4 parts of 85% phosphoric acid is stirred at 75° C. for 3.5 hours. The product is precipitated with 2000 parts of acetone and washed with four changes of acetone of 1000 parts each during 24 hours, then dried to give 70 parts of a white powder. Upon analysis the product was found to contain 4.92% sulfur, corresponding to a polymeric acetal of the following approximate structure:

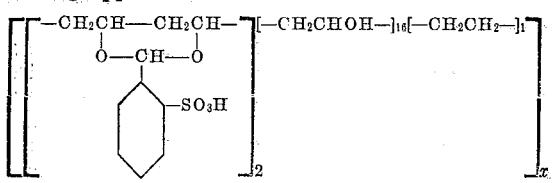

Fifty grams of this vinyl alcohol interpolymer acetal is dissolved in one liter of 90% ethanol by stirring at 60° C. for 10 minutes. The resulting solution has a pH of 3.5 and concentrated ammonia water is added (about 4–5 cc.) to neutralize the acid groups and to raise the pH to 9. Next one liter of ethanol and one liter of acetone are added simultaneously with stirring; then the mixture is made up to 20 liters by the additon of acetone. The resulting colorless fine dispersion is observed to be stable and unchanged over a period of two months.

This solution is coated onto standard 0.005 inch film bases of the following types: cellulose acetate of 55.6% combined acetic, cellulose acetate of 57% combined acetic acid, cellulose acetate-propionate, cellulose acetate-butyrate, cellulose nitrate, cellulose acetate having a thin water-proofing coating of cellulose nitrate, polyvinyl butyral, polyvinyl chloride, and nylon, e. g., polyhexamethylenesebacamide, to form layers varying from 0.05 to 2 microns in thickness. These films, after drying at 60° C. for 15 minutes, are coated with a gelatin-silver halide emulsion and dried. The resulting film elements have the structure shown in Fig. 1 of the drawing and exhibit good anchorage when dry and when soaked in water at 20° C. for 24 hours, i. e., the emulsion layers show no tendency to strip or peel off the base.

*Example II*

A celulose nitrate film having a substratum coating as described in Example I is coated with (1) a silver halide dispersion in hydrolyzed ethylene/vinyl acetate interpolymer of ethylene/vinyl alcohol mol ratio about 1/20 as described in McQueen United States Patent 2,397,866, and (2) with a silver halide dispersion in polyvinyl alcohol of the type described in United States Patents 2,276,322 and 2,276,323, and (3) with a silver halide emulsion prepared in a water-soluble cellulose derivative of the type described in United States Patents 2,127,573 and 2,110,491, and (4) with silver halide emulsions prepared in color-forming binding agents as described in United States Patent 2,397,864 (Examples I, VII, VIII and X). After drying, it is observed that the light-sensitive coating adheres well both dry and when soaked at 20° C. for 24 hours in water.

*Example III*

A mixture of 44 parts of 100% hydrolyzed polyvinyl acetate (viscosity of 4% aqueous solution at 20° C., 50 centipoises), 400 parts of glacial acetic acid, 17.5 parts of phthaldehydic acid, and 6 parts of 85% phosphoric acid is stirred at 75°–80° C. for three hours. The product is precipitated by addition of 1000 parts of methanol, then washed with nine changes of acetone (1000 parts each), and dried to give 65 parts of a white solid. Fifty grams of this solid are used as in Examples I and II in place of the vinyl alcohol interpolymer acetal of Example I with similar results.

*Example IV*

A mixture of 50 parts of 76–79% hydrolyzed polyvinyl acetate (viscosity of 4% aqueous solution at 25° C., 50–60 centipoises), 20 parts of glyoxylic acid, 400 parts of dioxane, and 6 parts of 85% phosphoric acid is stirred at 80° C. for four hours. The suspension is washed with acetone as in Example III above. Fifty grams of the resulting white solid is used in place of the acetal resin of Example I according to the procedure of Example II with similar results.

*Example V*

A mixture of 50 parts of acid hydrolyzed vinyl chloride/vinyl acetate interpolymer of mol ratio about 1 of vinyl chloride to 10 of vinyl acetate for the initial polymer, 20 parts of benzaldehyde-o-sulfonic acid, 500 parts of dioxane, and 5 parts of 85% phosphoric acid is stirred at 80° C. for four hours, then isolated, washed, and dried as in Example IV. This resin is used in place of the polymeric acetal of Example I with similar results.

*Example VI*

A cellulose nitrate film base, having a substratum coating of the type described in Example I, is coated with a gelatin-silver halide emulsion, and dried. Over this is coated a thin layer of the acidic polymeric acetal of Example I by dipping the film in an 0–1% solution of this polymeric compound in a 50–50 ethanol-water mixture containing enough ammonium hydroxide to raise the pH to 7.5. After drying, the surface is coated by dipping in a solution of hydrolyzed ethylene/vinyl acetate interpolymer of mol ratio about 1/20 prepared as described in Example I. After drying, it is observed that there is good adhesion between the two water-sensitive layers and the silver halide layer after exposure can be developed normally.

*Example VII*

To 100 parts of a gelatin-silver bromide emulsion (10% total solids) is added 1 part of the macromolecular acetal of Example I. This emulsion is coated on a subbed cellulose acetate base as described in Example I and dried. Over this is coated a layer of the interpolymer of vinyl alcohol and ethylene as described in Example I to which has been added 10% of the macromolecular acetal of Example I. These two incompatible water-permeable layers adhered to each other well, whereas when the acidic acetal resin was omitted poor adhesion resulted.

*Example VIII*

An element is prepared as in Example VII where the hydrolyzed ethylene/vinyl acetate is used as the emulsion binder (U. S. P. 2,397,866) and the gelatin is used as an overcoating layer. Similar good adhesion is observed.

*Example IX*

Two pieces of polyhexamethyleneadipamide film base (U. S. P. 2,216,735) having anchor coatings as described in Example I are coated, one with a gelatin-silver halide emulsion and the other with a silver halide-hydrolyzed ethylene/vinyl acetate interpolymer emulsion as described in Example II. The anchorage in both cases is very good. These films, after drying, are coated on the emulsion surface with a 5% solution of the sulfobenzaldehyde acetal polymer of Example I dissolved in water having sufficient sodium hydroxide to raise the pH to 8. After drying the emulsions are observed to have good resistance to abrasion and scratching.

*Example X*

Films are prepared as in Examples VI and VII using in place of the hydrolyzed ethylene/vinyl acetate interpolymer, color forming polyvinyl acetals of the type described in United States Patents 2,310,943 (Example I), 2,320,422 (Example VIII), and 2,397,865 (Example IX). These films when developed in a p-aminodiethylaniline color developer yield blue-green, magenta, and yellow dyes, respectively. There is no tendency for the polyacetal layers to separate from the gelatin layers.

In place of the specific polymeric acetals of vinyl alcohol polymers set forth in the above examples, there may be substituted similar acetals of other aldehydes containing carboxylic and/or sulfonic acid groups. Suitable additional aldehydes includes aliphatic sulfoaldehydes of the formula $HSO_3(CH_2)_nCHO$, where $n$ is 2 to 10, e. g., beta-sulfopropionaldehyde, aliphatic carboxyaldehydes of the formula $HOOC(CH_2)_nCHO$, where $n$ is 2 to 10, e. g., beta-formylpropionic acid; benzaldehyde-parasulfonic acid, terephthalaldehydic acid, p-(beta-formylethyl)-benzoic acid and o-carboxymethoxybenzaldehyde.

Other polymers containing hydroxyl groups than those of the specific examples may be employed in preparing the hydrophilic acetals of this invention providing they have the required hydroxyl content as heretofore described. A partial list of these polymers is as follows:

Polyvinyl acetate and propionate being 50% or more hydrolyzed,
Polyvinyl alcohol acetals of acetaldehyde, propionaldehyde, butyraldehyde, and benzaldehyde having 25% or less substitution.
Ethylene/vinyl acetate interpolymers having one mol or less of ethylene for each mol of vinyl acetate, hydrolyzed to such an extent that there is a least one hydroxyl group for each four chain carbon atoms.
Vinyl halide/vinyl acetate interpolymers having one mol or less of vinyl chloride for each two mols of vinyl acetate hydrolyzed to such an extent that there is at least one hydroxyl group for each four chain carbon atoms.

The solvent mixture used in preparing the coating solutions often contains major portions of those solvents that soften or dissolve the film base to be subbed, but they are usually either water-miscible or capable of dissolving at least 10% of water and have a boiling point below 150° C. Such mixtures can be prepared from any of the following solvents: water, methanol, ethanol, propanol, n-butanol, methyl acetate, ethyl acetate, cyclohexane, benzene, acetone, methyl ethyl ketone, diethyl ketone, methylene chloride, chloroform, carbon tetrachloride, trichloroethylene, etc. It is often desirable to incorporate small amounts (10% or less) of high-boiling solvents, such as dimethylformamide, ethylene glycol, diacetone alcohol, 2-ethoxyethanol, cyclohexanone, etc., to improve the anchorage, smoothness, and clarity of the substratum layer. Water is also usually present in these subbing solutions to aid in securing good solution and dispersion and may vary in concentration from about 1 to 40% depending on the acetal used and the support to be coated.

Other basic reacting materials than ammonia may be used to raise the pH of the acidic polymeric acetal coating solutions. Thus, in addition to the amines described above, diamylamine, triethanolamine, pyridine, alkali metal hydroxides, etc., may be added in controlled amounts.

The hydrophilic polymeric acetals containing —COO— or —$SO_3$— radicals may be used in coating compositions in conjunction with other hydrophilic or water-permeable polymeric materials. Thus, gelatin, cellulosic derivatives, polyamides, vinyl or vinylidene polymers, etc., may be incorporated in small portions in the coating solutions although such materials are not necessary to secure good anchorage.

An important feature of this invention is exemplified in Examples II, III, IV, VI, VII, and VIII where hydrophilic hydroxyl polymer silver-halide emulsions are anchored to supports by means of the hydrophilic polyvinyl acetals described above. Heretofore, anchorage of such colloids has been poor and difficult to accomplish as the conventional gelatin substrata were ineffective. Additional synthetic colloids which can be anchored by these methods include polyvinyl alcohols and polyvinyl alcohol derivatives in general, e. g., partially hydrolyzed polyvinyl acetates, and mixed polyvinyl-chloride-acetates and hydrolyzed interpolymers of vinyl acetate with unsaturated compounds, for example, maleic anhydride, acrylic acid esters, etc. Suitable colloids of the last mentioned types are disclosed in United States Patents 2,276,322, 2,276,323 and 2,397,866. Still other colloids include hydrophilic partially substituted polyvinyl esters and acetals and the low substituted cellulose esters of saturated aliphatic monocarboxylic acids of 2 to 4 carbon atoms and low substituted cellulose ethers, e. g., methyl-cellulose, ethyl-cellulose, etc. Additional natural colloids include casein, albumin, gum arabic, agar agar, polyglycuronic acid, etc., which are also anchored to supports by these new substrata.

Another important feature of this invention is in the anchoring of dissimilar water-permeable colloids one to another as in Examples VI, VII, VIII, and X. Such colloids as gelatin and vinyl alcohol polymers are incompatible and when coated one on the other exhibit little or no anchorage. The water-soluble acetal polymers described above, however, bring about good anchorage between such layers. Actually it is not necessary to use them as a separate layer but since they are compatible with both types of colloids a small amount can be added to each layer. In this way good anchorage between the layers is obtained without a separate coating step. This is of value in the preparation of multilayer elements for color photography and admits of the use of diverse emulsion layers, adjacent color-forming layers, separators, and filter layers.

Various radiation-sensitive materials may be present in the layers coated onto the anchoring substrata. In addition to light-sensitive silver salts, such as silver chloride, silver bromide, silver-chloride-bromide, silver-chloride-iodide and similar mixtures, there may be utilized bichromated hydrophilic colloids, e. g., albumin, gelatin, gum arabic, polyvinyl alcohols, or glue. Immobile color formers, dye intermediates or dyes may be present in such layers. Other materials include light-sensitive iron salts and diazonium compounds with or without coupling components. With certain of these light-sensitive materials, e. g., the diazo compounds, the binding agent may have a low sensitivity to water. Thus, polyvinyl acetate or a cellulose acetate may be used as the colloidal binder.

Another advantage in the use of these new substrata in producing colored pictures is due to their low stain characteristics. In producing colored pictures by imbibition or color coupling using ordinary substrata it is often observed that the anchor layer becomes colored due to a high dye retention. Prolonged washing fails to remove this stain. With these new acidic acetal resins no staining occurs and clearer, sharper color reproductions are obtained.

The macromolecular acetals of this invention are readily dispersible in aqueous solutions due to the presence of a plurality of acidic (—COOH and —SO3H) groups or their salts in each molecule. For this reason the excellent wet anchorage they provide even when elements are soaked in water for long periods of time is surprising and entirely unexpected.

Another advantage of the present invention is in the small amount of these derivatives required to secure anchorage. Instead of requiring 5 to 20 grams of material per liter of subbing solution as is the case with previously known materials, good anchorage is obtained with the water-soluble macromolecular acetals of the present invention using as little as 2 to 3 grams per liter of coating (subbing solution). This ability to obtain good anchorage with such small amounts of the acetals leads to a greater economy in film preparation and may be the reason why improved toughness in the final emulsion coated film is obtained.

The substratum coatings adhere firmly to water-insensitive materials in general, such as cellulose ester film base, e. g., cellulose nitrate, cellulose triacetate, cellulose acetate-butyrate, cellulose acetate-propionate, ethyl cellulose; nylon, polyvinyl acetals, vinyl resins, e. g., polyvinyl chloride, polyvinyl fluoride, etc., providing the proper solvent system is used, i. e., one which has a solvent or softening action on the film base.

These substrata are not necessarily used alone to join the support and light-sensitive layer, but may, if desired, be used in conjunction with other substratum layers such as gelatin, water-sensitive cellulose esters, water-proofing layers, anti-halation layers, and filter layers. Also, it is possible to incorporate removable or bleachable silver and anti-halation dyes in these layers. As illustrated in Example IX, the vinyl acetal polymers form good anti-abrasion layers over emulsion coatings.

The products of this invention have wide application in the general field of photography, depending upon the type of water-permeable colloid layers attached to the support. When light-sensitive silver halide dispersions in water-permeable binders are employed, these elements are useful in producing the common photographic negatives and cine positives. The films are also useful in producing matrices for printing or dye transfers and for use in the graphic arts in general. Color films using these substrata are especially useful since the substrata contain no migratory or volatile acidic compounds which can cause fading of the colors. The products also have wide utility in fields outside of photography, e. g., in special adhesive uses and in the treatment of textiles.

As many widely different embodiments of this invention can be made without departing from the spirit and scope thereof, it is to be understood that the invention is not to be limited except as defined by the claims.

What is claimed is:

1. A photographic element comprising a water-insensitive support and a water-permeable colloid layer anchored thereto with a thin layer of a hydrophilic acetal of a vinyl alcohol polymer with an aldehyde containing a group taken from the class consisting of free carboxylic acid and free sulfonic acid groups and their water-soluble salts but which is otherwise unsubstituted.

2. A photographic element comprising a transparent film base and a photographically sensitive water-permeable colloid layer anchored to said base by an intervening thin substratum composed of a hydrophilic acetal of a vinyl alcohol polymer with an aldehyde containing a group taken from the class consisting of carboxylic acid and sulfonic acid groups and their salts with a water-soluble salt-forming cation but which is otherwise unsubstituted.

3. A flexible photographic film element comprising a transparent water-insensitive film base and in order thereon a substratum composed of a hydrophilic salt taken from the class consisting of alkali metal, ammonium and amine salts of an acetal of a vinyl alcohol polymer with an aldehyde containing an acid group taken from the class consisting of carboxylic acid and sulfonic acid groups but which is otherwise unsubstituted and a water-permeable colloid-silver halide emulsion layer.

4. A photographic element comprising a transparent film base and in order thereon a layer of a hydrophilic ammonium salt of an acetal of a vinyl alcohol polymer with an unsubstituted benzaldehyde sulfonic acid and a water-permeable colloid layer containing a light-sensitive material.

5. A photographic element comprising a transparent film base and in order thereon a water-permeable colloid layer anchored thereto with a thin layer of a hydrophilic ammonium salt of an acetal of a vinyl alcohol polymer with an aldehyde containing an acid group taken from the class consisting of a carboxylic acid and sulfonic acid groups but which is otherwise unsubstituted, and a layer composed of hydrolyzed ethylene/vinyl acetate interpolymer containing light-sensitive silver halides.

6. In a photographic element having a water-permeable colloid layer containing a light-sensitive material, a layer composed of a hydrophilic salt taken from the group consisting of alkali metal, ammonium and amine salts of an acetal of a vinyl alcohol polymer with an aldehyde containing an acid group taken from the class consisting of carboxylic acid and sulfonic acid groups but which is otherwise unsubstituted, in intimate contact therewith.

7. A photographic element comprising a support, a light-sensitive stratum and a unit consisting of a gelatin layer and a hydrophilic hydroxyl polymer layer having intercalated therebetween a layer composed of a hydrophilic salt taken from the group consisting of alkali metal, ammonium and amine salts of a colorless acetal of a vinyl alcohol polymer with an aldehyde containing a sulfonic acid group but which is otherwise unsubstituted, said polymer having from 1 to 20% of the hydroxyl groups acetalized.

8. A flexible photographic film element comprising a transparent, water-insensitive film base and in order thereon a substratum composed of a hydrophilic salt taken from the group consisting of alkali metal, ammonium and amine salts of an acetal of a polyvinyl alcohol with an aldehyde containing an acid group taken from the class consisting of carboxylic acid and sulfonic acid groups but which is otherwise unsubstituted and a hydrophilic hydroxyl polymer-silver halide emulsion layer.

9. A photographic element comprising a transparent film base and in order thereon a layer of o-sulfobenzaldehyde acetal of polyvinyl alcohol and a water-permeable colloid layer containing light-sensitive silver halides, said acetal being hydrophilic and from 1 to 20% of the hydroxyl groups being acetalized with said aldehyde.

DAVID W. WOODWARD.

REFERENCES CITED

The following references are of record in the file of this patent:

FOREIGN PATENTS

| Number | Country | Date |
| --- | --- | --- |
| 546,631 | Great Britain | July 22, 1942 |

Certificate of Correction

Patent No. 2,462,151. February 22, 1949.

DAVID W. WOODWARD

It is hereby certified that errors appear in the printed specification of the above numbered patent requiring correction as follows:

Column 3, line 55, for "5,000 to 50,0000" read *5,000 to 50,000*; column 5, line 68, Example II, for "and X" read *and XI*;

and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*